(12) United States Patent
Tzakikario et al.

(10) Patent No.: US 7,620,733 B1
(45) Date of Patent: Nov. 17, 2009

(54) DNS ANTI-SPOOFING USING UDP

(75) Inventors: Rephael Tzakikario, Kfar Saba (IL);
Dan Touitou, Ramat Gan (IL); Guy Pazi, Ramat Hasharon (IL)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 11/094,732

(22) Filed: Mar. 30, 2005

(51) Int. Cl.
*G06F 15/16* (2006.01)

(52) U.S. Cl. ....................... 709/245; 709/229
(58) Field of Classification Search ............... 709/245
See application file for complete search history.

(56) References Cited

U.S. PATENT DOCUMENTS

| | | |
|---|---|---|
| 5,067,074 A | 11/1991 | Farel et al. |
| 5,511,122 A | 4/1996 | Atkinson |
| 5,689,508 A | 11/1997 | Lyles |
| 5,826,014 A | 10/1998 | Coley et al. |
| 5,841,775 A | 11/1998 | Huang |
| 5,898,830 A | 4/1999 | Wesinger et al. |
| 5,905,730 A | 5/1999 | Yang et al. |
| 6,005,926 A | 12/1999 | Mashinsky |
| 6,055,236 A | 4/2000 | Nessett et al. |
| 6,072,800 A | 6/2000 | Lee |
| 6,134,217 A | 10/2000 | Stiliadis et al. |
| 6,182,226 B1 | 1/2001 | Reid et al. |
| 6,185,680 B1 | 2/2001 | Shimbo et al. |
| 6,208,652 B1 | 3/2001 | Stephens et al. |
| 6,304,913 B1 | 10/2001 | Rune |
| 6,314,463 B1 | 11/2001 | Abbott et al. |
| 6,335,927 B1 | 1/2002 | Elliott et al. |
| 6,351,775 B1 | 2/2002 | Yu |
| 6,397,335 B1 | 5/2002 | Franczek et al. |
| 6,502,135 B1 | 12/2002 | Munger et al. |
| 6,513,122 B1 | 1/2003 | Magdych et al. |
| 6,907,525 B2* | 6/2005 | Pazi et al. ................ 713/170 |
| 7,171,683 B2* | 1/2007 | Pazi et al. ................ 726/13 |
| 2002/0083175 A1 | 6/2002 | Afek et al. |
| 2002/0143989 A1* | 10/2002 | Huitema et al. ........... 709/243 |
| 2003/0070096 A1 | 4/2003 | Pazi et al. |
| 2003/0110274 A1 | 6/2003 | Pazi et al. |
| 2004/0148398 A1* | 7/2004 | Park ....................... 709/227 |
| 2004/0194102 A1* | 9/2004 | Neerdaels ................. 718/100 |

(Continued)

FOREIGN PATENT DOCUMENTS

WO    WO 02/33870    4/2002

OTHER PUBLICATIONS

Bennett, J.C.R. et al. "Hierarchical Packet Fair Queueing Algorithms", 1996.

(Continued)

*Primary Examiner*—Jeffrey Pwu
*Assistant Examiner*—Shaq Taha
(74) *Attorney, Agent, or Firm*—Abelman, Frayne & Schwab

(57) ABSTRACT

A method for authenticating communication traffic includes receiving a first Domain Name System (DNS) request, sent using a connectionless protocol over a network from a source address, to provide network information regarding a domain name. Responsively to the first DNS request, a client at the source address is solicited to send a second DNS request using the connectionless protocol. An authenticity of the first DNS request is assessed based on the second DNS request.

24 Claims, 2 Drawing Sheets

U.S. PATENT DOCUMENTS

2005/0044352 A1* 2/2005 Pazi et al. .................. 713/153

OTHER PUBLICATIONS

Bennett, J.C.R. et al. "WF2Q: Worst-Case Fair Weighted Fair Queueing", 1996.

Chiussi, F.M. et al. "Implementing Fair Queueing in ATM Switches: The Discrete-Rate Approach", 1998.

Chiussi, F.M. et al. "Minimum-Delay Self-Clocked Fair Queueing Algorithm for Packet-Switched Networks", 1998.

Demers, A. et al. "Analysis and Simulation of a Fair Queueing Algorithm", 1989 Association for Computing Machinery.

Eckhardt, D.A. et al. "Effort-limited Fair (ELF) Scheduling for wireless Networks", IEEE INFOCOM 2000.

Golestani, S.J. "Networks Delay Analysis of a Class of fair Queueing Algorithms", IEEE Journal on Selected Areas in Communications, vol. 13, No. 6, Aug. 1995, pp. 1057-1070.

Golestani, S.J. "A self-Clocked fair Queueing Scheme for Broadband Applications", IEEE 1994, pp. 5c.1.1-5c1.11.

Greenberg, Albert G. et al. "How Fair is Fair Queuing?" Journal of the Association for Computing Machinery vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Multiple Node Case", IEEE/ACM Transactions on Networking vol. 2, No. 2, Apr. 1994, pp. 137-150.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco. Systems, Inc. 2002.

Rexford, J.L. et al. "Hardware Efficient Fair Queueing Architectures for high-Speed networks", IEEE 1996, pp. 5d.2.1-5d.2.9.

Shreedhar M. et al. "Efficient Fair Queueing Using Deficit Round-Robin", IEEE/ACM Transactions on networking vol. 4, No. 3, Jun. 1996, pp. 375-385.

Stiliadis, D. et al. "Frame-Based Fair Queueing: A New Traffic Scheduling Algorithm for Packet-Switched Networks", Jul. 1995, pp. 1-43.

Mockapetris, "Domain Names—Implementation and Specification", RFC 1035, 1987.

D. Eastlake, "Domain Name System Security Extensions", RFC 2535, Mar. 1999.

Mockapetris, "Domain Names—Concepts and Facilities", RFC 1034, 1987.

* cited by examiner

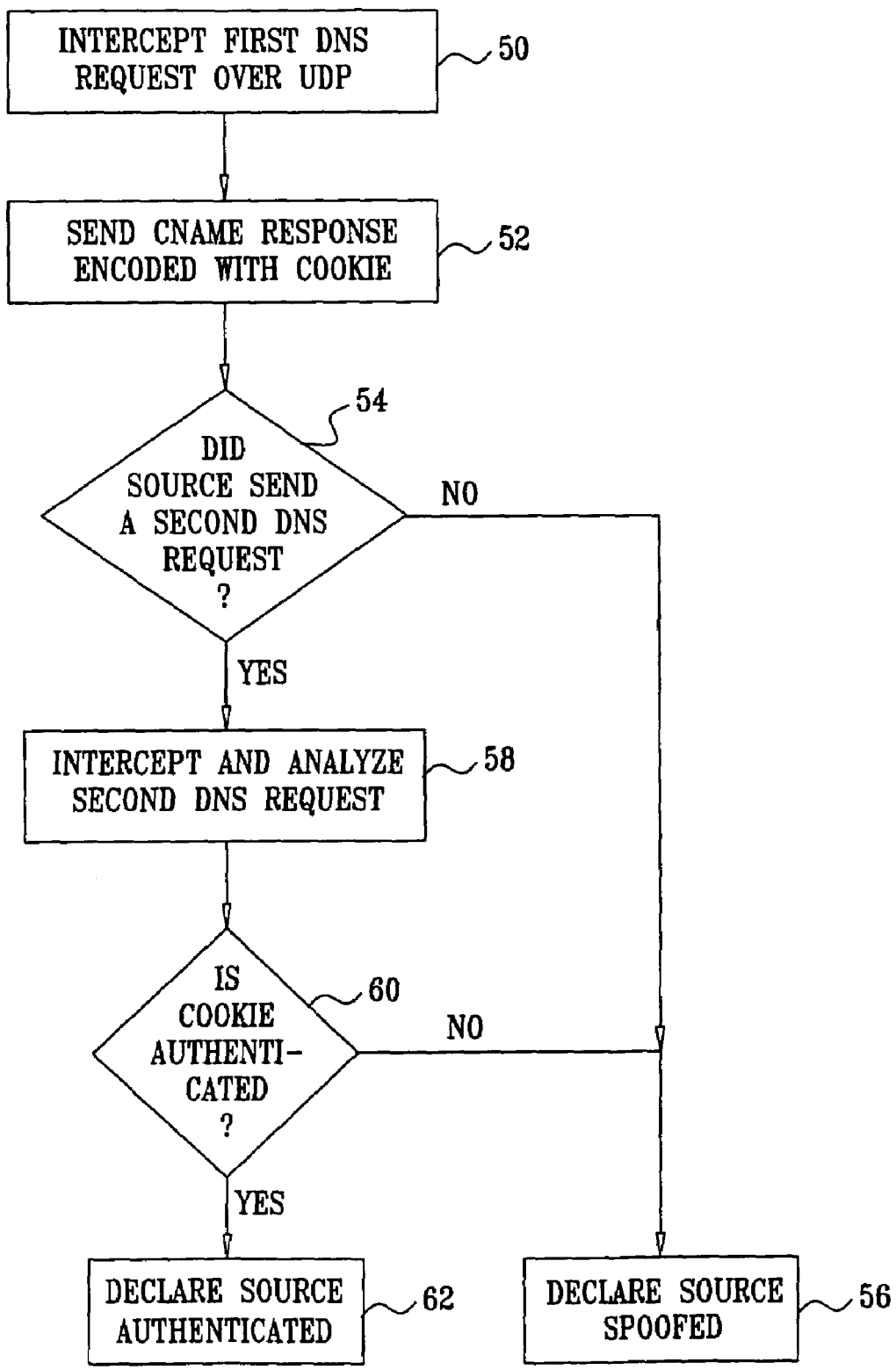

DNS ANTI-SPOOFING USING UDP

FIELD OF THE INVENTION

The present invention relates generally to computer networks, and specifically to methods and systems for protecting against denial of service attacks in computer networks.

BACKGROUND OF THE INVENTION

In a Denial-of-Service (DoS) attack, an attacker bombards a victim network or server with a large volume of message traffic. The traffic overload consumes the victim's available bandwidth, CPU capacity, or other critical system resources, and eventually brings the victim to a situation in which it is unable to serve its legitimate clients. Distributed DoS (DDoS) attacks can be even more damaging, as they involve creating artificial network traffic from multiple sources simultaneously. Many DDoS attacks use "spoofed" IP packets—packets containing a bogus IP source address—making it more difficult for the victim network to defend itself against attack.

Domain Name System (DNS) servers are a favored target of DDoS attackers. DNS provides a distributed database of domain names and their associated information, such as IP addresses and alias names. DNS servers use the database to translate domain names into their corresponding IP addresses and to retrieve other information associated with specific names. DNS is described in detail by Mockapetris in "Domain Names-Concepts and Facilities," published as Request for Comments (RFC) 1034 (1987) of the Internet Engineering Task Force (IETF) Network Working Group; and in "Domain Names-Implementation and Specification," published as IETF RFC 1035 (1987). Both of these documents are incorporated herein by reference and are available on the Internet at the URL www#ietf#org, in which the symbol "#" substitutes for the character ".".

The majority of DNS request and reply traffic on the Internet is carried over the User Datagram Protocol (UDP), which is a connectionless protocol. Methods for protection against spoofed DNS messages that use UDP are described in U.S. Patent Application Publication 2003/0070096 A1, whose disclosure is incorporated herein by reference. The inventors describe a guard system that receives a DNS request carried over UDP from an unknown or suspicious IP source address. The guard system forces the client to repeat the request over the Transmission Control Protocol (TCP). The client establishes a TCP connection with the guard system, using the conventional three-way handshake mandated by the TCP protocol. The guard system uses the handshake to verify the authenticity of the client.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for authenticating DNS requests, in accordance with an embodiment of the present invention.

DETAILED DESCRIPTION OF EMBODIMENTS

Figure 1:
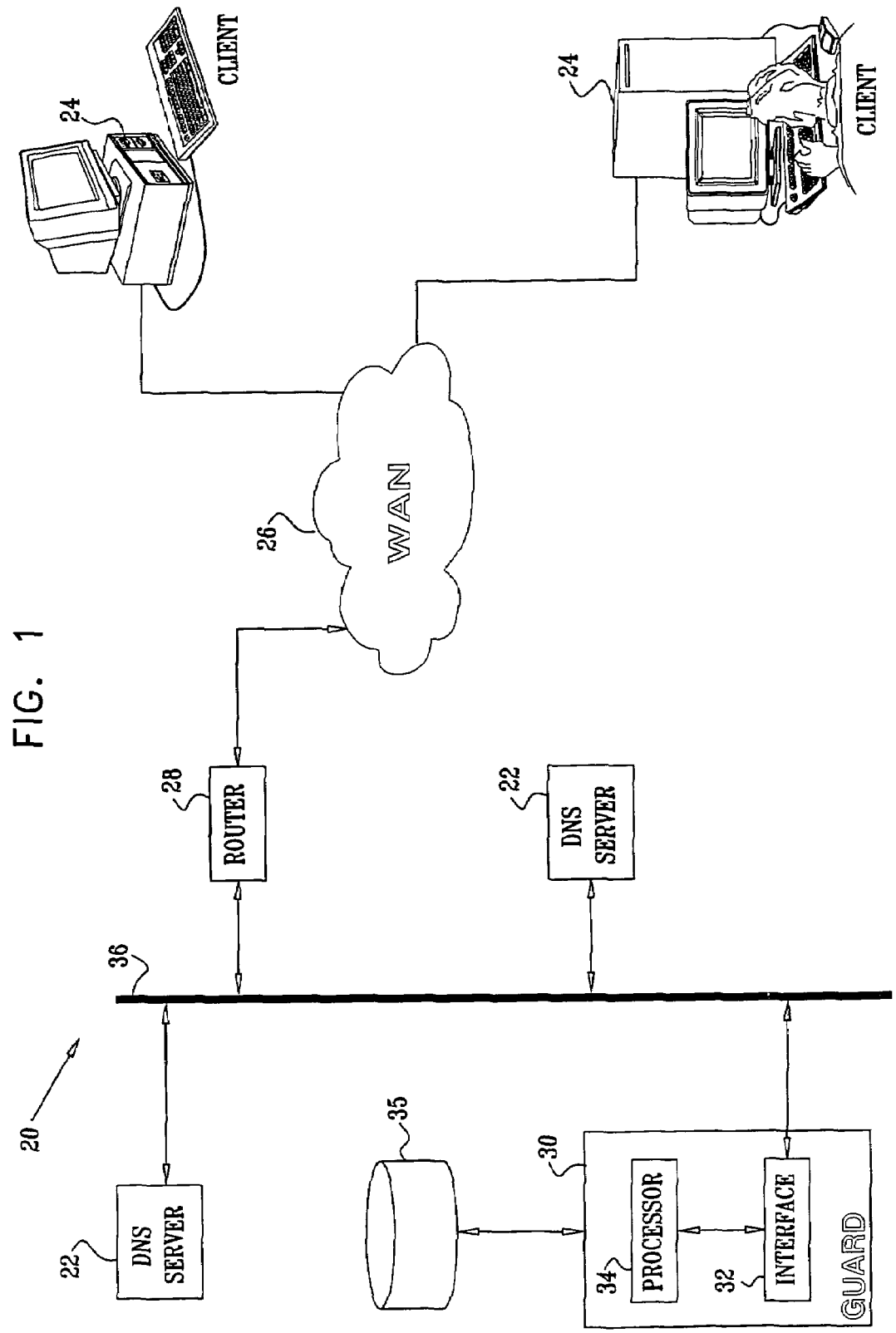
FIG. 1 is a block diagram that schematically illustrates a computer network system, in accordance with an embodiment of the present invention.

In a DDoS attack on a DNS server, a hacker typically submits a large number of simultaneous DNS requests, which overload the capability of the server to respond. The DNS protocol does not use any handshake mechanism, and the notion of a session between the client and the server does not exist. As noted above, the vast majority of DNS traffic on the Internet is carried over UDP, which is a connectionless protocol. Therefore, it is easy for hackers to spoof DNS/UDP messages (including the source IP address) and thus to overload the DNS server without the server being able to easily identify the source IP addresses from which the attack is coming.

DNS/UDP authentication methods that solicit the source address to retry the DNS request using TCP have been described, for example, in U.S. Patent Application Publication 2003/0070096 cited above. However, in many practical scenarios such methods cannot be used. For example, many clients use DNS resolvers that support only UDP and cannot switch to TCP. (Resolvers are standard programs, accessed by user applications, that extract information from DNS servers in response to client requests.) In other scenarios a firewall is configured to block TCP traffic from reaching the DNS resolver. In all such cases a request by the guard system to revert to TCP will cause the authentication process to fail, even though the client may be innocent.

In view of these limitations of the prior art, embodiments of the present invention provide methods and systems for DNS authentication that use UDP as the exclusive communication protocol. The authentication methods described herein comprise a "challenge-response" exchange of messages between a guard system and an unauthenticated source, utilizing only conventional DNS messaging mechanisms carried over UDP.

System Description

FIG. 1 is a block diagram that schematically illustrates a computer network system 20, in accordance with an embodiment of the present invention. A DNS server 22 communicates with clients 24 via a wide-area network (WAN) 26 (typically the Internet) through a router 28. To prevent DDoS attacks on server 22, a guard device 30 intercepts incoming DNS request packets from network 26 that are addressed to the protected server. Guard device 30 comprises a network interface 32 for communicating with the different nodes of system 20, and a guard processor 34 for performing authentication functions. The DNS server, router and guard device typically communicate with each other over a local-area network (LAN) 36.

The guard device typically checks the IP source address of each packet that it intercepts against reference values stored in a database 35. (Although in the present embodiment database 35 is used to store IP/DNS records, it will be understood that substantially any suitable memory device and data structure may be used for storing this information, and not only a database.) The guard device may perform these packet screening and verification functions at all times, or it may alternatively become active only under stress conditions, in which a DDoS attack on server 22 is suspected because of the volume and/or other characteristics of incoming traffic from WAN 26.

If the source address of an incoming DNS request packet matches an entry in database 35, guard device 30 passes the packet on to server 22. Alternatively, further anti-DDoS processing measures may be carried out before the packet is delivered to the server.

Otherwise, if the source address does not match an entry in the database, the guard device regards the current DNS request packet as suspect. It therefore initiates a challenge-response method to verify the authenticity of the request and of the IP source address of the client that sent the DNS request, as will be described below. If the challenge-response procedure is successful in verifying that the DNS request is legitimate (i.e., sent by a real client, and not a spoofed source), the guard device adds the IP source address of the client to database 35 and allows subsequent requests from this address to reach server 22. Otherwise, the DNS request is typically discarded.

Typically, guard device 30 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard device 30 may be implemented in dedicated hardware logic, or using a combination of hardware and software elements. The guard device may be a standalone unit, or it may alternatively be integrated with other communication or computing equipment, such as router 28 or a firewall or intrusion detection system.

In some practical applications the guard device may be used to protect multiple DNS servers whose traffic is diverted to the guard device, as shown in FIG. 1. The guard functionality may be distributed among multiple devices, at one or more access points to the DNS server or servers. The guard device may also be deployed in configurations similar to firewalls known in the art. The methods described hereinbelow for detecting spoofed DNS request packets may also be used by a standalone computer, running appropriate software, without a separate guard device.

Although in FIG. 1 the guard device and DNS servers connect to the Internet via LAN 36 and router 28, the methods and systems described herein may be implemented using any suitable network configuration.

DNS/UDP Authentication Method

FIG. 2 is a flow chart that schematically illustrates a method for authenticating DNS requests, in accordance with an embodiment of the present invention. The method begins with guard device 30 intercepting a DNS/UDP request message, at a first interception step 50. The DNS request originates from a client having an unauthenticated source address, and is addressed to DNS server 22. The client typically sends the DNS request to query the DNS server for an IP address that corresponds to a domain name given in the request.

Since the DNS request was sent by an unauthenticated source, the guard device does not pass the request to DNS server 22, but rather initiates a process of authenticating the DNS request (i.e., verifying that the request was sent by a real client owning the source address, and not by a spoofed source). The authentication process carried out by the guard device is a "challenge-response" process, in which the source address is solicited to transmit another DNS request. If the source address does receive the challenge and responds to it correctly, the guard device concludes that the source address is indeed legitimate and not spoofed.

For this purpose, guard processor 34 sends, via network interface 32, a DNS response to the unauthenticated source address, at a challenging step 52. The DNS response (the "challenge") informs the client that the queried domain name is not the canonical name of the domain, but an alias, using the DNS CNAME tag. The DNS response also contains the canonical domain name. (The use of canonical domain names and aliases is described in detail in section 3.6.2 of RFC 1034 cited above.) For example, assume the DNS request queries server 22 for the IP address corresponding to the domain name example.com. The DNS response sent by the guard in response to this request has the form "example.com CNAME cookie.example.com.guard-as.com", informing the client that example.com is not a real domain name but an alias for the canonical domain name cookie.example.com.guard-as-.com. The meaning and use of cookie and guard-as.com are explained below.

According to DNS conventions, the resolver software of the client, upon receiving such a response, is responsible for sending a second DNS request to the DNS server. The second DNS request should query the server for the IP address of the canonical domain name (cookie.example.com.guard-as.com in the example above) as given in the DNS response.

The DNS response sent by the guard device also informs the client that it should not cache the received canonical domain name for later use. This notification ensures that if the client ever needs to query the same domain name again, it will not use the canonical domain name from the previous session (which is no longer relevant) but will query using the original domain name used in the first DNS request. In order to avoid caching by the client, the guard sets the DNS TTL (Time-To-Live) parameter of the DNS response to zero. (The DNS TTL parameter defines how long the received information may be cached before it should be discarded. TTL=0 means caching is prohibited.) The use of DNS TTL is further described in section 3.6 of RFC 1034 cited above.

It is desirable that the challenge-response process be implemented in such a way that a legitimate client will indeed respond to the challenge and send server 22 a second DNS request querying the canonical name. A legitimate client may fail to respond to the challenge for two main reasons:

1. The client may detect a loop. If the DNS response directs the client to query for information that could have been given already in the first DNS response, the client may regard the guard device as a "lame server" and stop communicating with it.

2. The client may choose to send the second DNS request to a different DNS server, querying for the canonical name.

To avoid these situations and ensure that the client responds to the challenge and sends the second DNS request to the same DNS server, the DNS zones to which the original domain name and of the canonical domain name belong should be defined appropriately. The concept of zones is described in RFC 1034 cited above, particularly in sections 4.1 and 4.2.

In one embodiment, a new zone is defined for each protected DNS server. The new zone should be defined in the global DNS network such that the protected DNS server is the only authoritative server for this zone. This definition ensures that the client will have no other authoritative DNS server to query. For example, assume that the protected DNS server is ns1.example.net (which is the DNS server for domain mail.example.com, as well as others). A new zone named as-ns1-example.com is set up for purposes of the authentication process, with ns1.example.net defined as the only authoritative DNS server for as-ns1-example.com.

In an alternative embodiment, at least two zones (which may comprise existing zones already in use by the protected DNS server or new zones) are used for protecting each DNS server. The guard challenges all DNS requests for domain names that belong to the first zone with canonical names belonging to the second zone. All other DNS Requests (for domain names that belong to zones other than the first zone) are challenged with canonical names belonging to the first zone. The protected DNS server is defined as the only authoritative DNS server for both zones. For example, assume that the guard protects ns1.example.net, which is the sole authoritative DNS server defined for the two zones mail.example.com and irc.example.com. The guard device challenges all DNS requests for domain names anything.example.com (wherein "anything" means any string other than "mail") with canonical names belonging to the mail.example.com zone. DNS requests for domain names belonging to zone mail.example.com are challenged with canonical names belonging to irc.example.com.

In another alternative embodiment, a single new zone is defined, and its IP address is "owned" by the guard device itself. This new zone is used for authenticating all domain names belonging to all DNS servers protected by the guard device. The IP address defined as authoritative for the new zone may either belong to the guard device (e.g. a guard interface IP, or a guard proxy IP address), or may be an IP address permanently diverted through the guard device (i.e., the guard device is statically set as one of the nodes on the route to this IP address).

The zone definition methods described above were chosen as examples for the sake of conceptual clarity. Any other suitable zone allocation method may be used when implementing the authentication methods described herein. The condition that should be fulfilled is that the canonical name supplied by the guard device in the DNS response should belong to a zone for which the protected DNS server is authoritative. The zone allocation definitions can typically be determined and modified by an administrator. In the description that follows, the assumption is that the guard device uses such a zone for authentication purposes. This zone is denoted guard-as.com.

The canonical domain name inserted into the DNS response at step 52 is chosen by the guard device specifically for the purpose of performing authentication. In some embodiments, the canonical name comprises a string of characters comprising an encoded "cookie," i.e., a secret value that is encoded in the response. If the unauthenticated source address subsequently responds to the challenge with a second DNS request, the request will contain the cookie (as part of the queried canonical domain name). The presence of the cookie in the response enables the guard device to verify that the second DNS request was indeed sent from the same source address.

The guard device typically generates the cookie by encoding one or more of the following:

Source IP address of the first DNS request.

IP TTL (Time-To-Live) value of the first DNS request. IP TTL should not be confused with DNS TTL. The use of IP TTL is further described below.

The domain name queried by the first DNS request.

A pseudo-random number generated by the guard device. This number is typically cached by the guard device until the second DNS request is received, as will be described below.

The parameters given above were chosen as an example for demonstrating the concept of cookie generation. Any other suitable set of parameters, and any other suitable method for generating and authenticating cookies may be used when implementing the methods described herein. For example, a hash generator may implement a hash function for mapping packet attributes, such as the IP source address and port, to cookies. The hash generator calculates a hash value, which is used as a key for indexing a cookie table comprising a set of random cookies. The random cookie values are replaced after use to prevent an attacker who succeeds in discovering a legitimate cookie value from re-using the cookie.

Having sent the DNS response, the guard device checks whether the unauthenticated source address sends a second DNS request, at a response checking step 54. If no response is intercepted, the guard device concludes that the unauthenticated source address is spoofed, at a spoof declaration step 56. If, on the other hand, the unauthenticated source address does send the second DNS request, the guard device intercepts and analyzes this request at a second interception step 58.

In some embodiments, checking step 54 is not implemented explicitly. Instead, the guard device discards the first DNS request after sending the DNS response. If and when the guard device intercepts the second DNS request, it continues the method by analyzing the request at step 58.

Following the notation of the previous examples, The second DNS request should contain a query for a domain name of the form cookie.mail.example.com.guard-as.com. Upon receiving the second DNS request, having the form cookie.anyDNSname.guard-as.com, the guard decodes the "cookie" string extracted from the second request and checks whether the cookie comprises the correct information, at a cookie verification step 60. (Here guard-as.com is the zone used by the guard for authentication, and anyDNSname can be any valid DNS zone name.) The decoded cookie should comprise the same information encoded into the preceding DNS response at step 52 above. When authenticating the cookie, the guard may query database 35, if information such as a pseudo-random number is stored per each DNS request, or it may decode the cookie and check the decoded information against other information in the second DNS request packet, such as the IP source address or TTL value.

If the decoded cookie in the second DNS request does not match the cookie sent in the DNS response, the method reverts to spoof declaration step 56, concluding that the unauthenticated source address is spoofed. If the two cookies do match, the guard declares the source address authenticated, at an authentication step 62. The guard typically stores the authenticated source address in a "whitelist" of authenticated addresses in database 35. Subsequent DNS requests originating from this source address are then allowed to reach DNS server 22.

In one embodiment, following successful authentication and updating of the "whitelist," the guard device discards the second DNS request. The assumption is that the client will retry the DNS request, since it did not receive any response. The retried DNS request will now be allowed to reach DNS server 22, since the source IP address of the request has been authenticated. When using this implementation, the DNS response of step 52 may comprise the shorter form of cookie.as-guard.com instead of the longer cookie.mail.example.com.guard-as.com.

In an alternative embodiment, the guard extracts the original queried domain name of the first DNS request from the second DNS request. Following the notation of the example above, the guard device extracts the domain name mail.example.com from the domain name cookie.mail.example.com.guard-as.com, which was included in the second DNS request. The guard device then tries to retrieve the requested IP address itself from DNS server 22 and, if successful, sends a DNS response to the client. In order to perform this task, the guard device should comprise partial name resolver functionality.

In another embodiment, the guard device does not automatically allow subsequent DNS requests from authenticated source addresses to reach DNS server 22. The guard extracts the IP TTL value from each subsequent DNS request and compares it with the IP TTL value of the second DNS request received from the same source address, as stored in database 35.

Additionally or alternatively, the guard device may use TTL values in authenticating the second DNS request that is received at step 58. The IP TTL value, as is known in the art, is a function of the length of the route a packet has traversed through the Internet. Therefore, two packets originating from the same host are expected to arrive with a similar IP TTL value, typically within ±1 to ±2. Comparing the IP TTL values of subsequent DNS requests may thus assist in their authentication. The comparison verifies that these requests were generated by the legitimate source and not by a hostile host who may have spoofed an IP address that exists in the "whitelist." Further aspects of the use of IP TTL in packet authentication are described in U.S. Patent Application Publication US 2003/0110274 A1, whose disclosure is incorporated herein by reference.

Although the embodiments described above relate specifically to the DNS and UDP protocols, the principles of the present invention may similarly be applied in challenge/response authentication of application traffic of other sorts sent over connectionless protocols. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for authenticating a source IP address of a Domain Name System (DNS) request sent using a connectionless protocol to a DNS server, the method comprising:
    creating a new DNS zone in the server, exclusively for authentication;
    designating the server as the only authoritative server for said new DNS zone in a global DNS network;
    intercepting the DNS request;
    responsively to the DNS request:
        creating, by said only authoritative server for said new DNS zone, a new canonical domain name belonging to said new DNS zone, exclusively for authentication;
        sending by said only authoritative server for said new DNS zone a DNS response to the source IP address, wherein said DNS response solicits a client at the source IP address to send a DNS request containing a query for said new canonical domain name, using the connectionless protocol;
    receiving, using the connectionless protocol at said only authoritative server for said new DNS zone, a second DNS request containing a query for a requested domain name;
    comparing said requested domain name to said new canonical domain name; and
    assessing an authenticity of the source IP address based on a result of said comparing said requested domain name to said new canonical domain name.

2. The method according to claim 1, wherein the connectionless protocol comprises a User Datagram Protocol (UDP).

3. The method according to claim 1, wherein sending said DNS response comprises informing said client not to cache said new canonical domain name for use in future DNS requests.

4. The method according to claim 1, wherein sending said DNS response comprises encoding a first cookie into said new canonical domain name, and wherein said assessing an authenticity comprises decoding a second cookie in said second DNS request.

5. The method according to claim 4, wherein said encoding said first cookie comprises encoding at least one of:
    a first IP TTL (Time-to-Live) value extracted from the DNS request;
    an IP address corresponding to the source address;
    a character string representing said new canonical domain name; and
    a pseudo-random number.

6. The method according to claim 5, wherein said decoding said second cookie comprises comparing said first IP TTL value encoded in said second cookie to a second IP TTL value extracted from said second DNS request.

7. The method according to claim 5, wherein said encoding said first cookie comprises storing at least a part of said first cookie in an authentication data structure, and wherein said assessing an authenticity comprises comparing said at least part of said first cookie with a corresponding part of said second cookie.

8. The method according to claim 1, further comprising, following a successful assessment of an authenticity of the DNS request, retrieving and providing network information regarding a domain name to said client.

9. The method according to claim 1, further comprising, following a successful assessment of an authenticity of the DNS request, storing the source IP address in a whitelist of authenticated source addresses.

10. Apparatus for authenticating a source IP address of a Domain Name System (DNS) request sent using a connectionless protocol to a DNS server, the apparatus comprising:
    a network interface, which is arranged to receive the DNS request; and
    a processor, which is arranged:
        to create a new DNS zone in the server, exclusively for authentication;
        to designate that the server is the only authoritative server for said new DNS zone in a global DNS network;
        to intercept the DNS request;
        responsively to the DNS request:
            to create a new canonical domain name belonging to said new DNS zone, exclusively for authentication;
            to send a DNS response to the source IP address, which solicits a client at the source IP address to send a DNS request containing a query for said new canonical domain name, using the connectionless protocol;
        to receive, using the connectionless protocol, a second DNS request containing a query for a requested domain name;
        to compare said requested domain name to said new canonical domain name; and
        to assess an authenticity of the source IP address based on a result of said comparing said requested domain name to said new canonical domain name.

11. The apparatus according to claim 10, wherein the connectionless protocol comprises a User Datagram Protocol (UDP).

12. The apparatus according to claim 10, wherein said processor is further arranged to inform said client not to cache said new canonical domain name for use in future DNS requests.

13. The apparatus according to claim 10, wherein said processor is further arranged to encode a first cookie into said new canonical domain name, and to decode a second cookie in said second DNS request.

14. The apparatus according to claim 13, wherein said processor is further arranged to encode into said first cookie at least one of:
    a first IP TTL (Time-to-Live) value extracted from the DNS request;
    an IP address corresponding to the source IP address;
    a character string representing said new canonical domain name; and
    a pseudo-random number.

15. The apparatus according to claim 14, wherein said processor is further arranged to compare said first IP TTL value encoded in said second cookie to a second IP TTL extracted from said second DNS request.

16. The apparatus according to claim 14, wherein said processor is further arranged to store at least a part of said first cookie in an authentication data structure and, responsively to said second DNS request, to compare said at least part of said first cookie with a corresponding part of said second cookie.

17. The apparatus according to claim 10, wherein said processor is further arranged, following a successful assessment of an authenticity of the DNS request, to retrieve and provide network information regarding a domain name to said client.

18. The apparatus according to claim 10, wherein said processor is further arranged, following a successful assessment of an authenticity of the DNS request, to store the source IP address in a whitelist of authenticated source addresses.

19. Apparatus for authenticating a source IP address of a Domain Name System (DNS) request sent using a connectionless protocol to a DNS server, the apparatus comprising:
    means for creating a new DNS zone in the server, exclusively for authentication;
    means for designating that the server is the only authoritative server for said new DNS zone in a global DNS network;
    means for intercepting the DNS request;
    means for creating a new canonical domain name belonging to said new DNS zone, exclusively for authentication;
    means for sending a DNS response to the source IP address responsively to the DNS request, which solicits a client at the source IP address to send a second DNS request containing a query for said new canonical domain name;
    means for receiving, using the connectionless protocol, a second DNS request containing a query for a requested domain name;
    means for comparing said requested domain name to said new canonical domain name; and
    means for assessing an authenticity of the source IP address based on a result of said comparing said requested domain name to said new canonical domain name.

20. A computer software product for authenticating a source IP address of a Domain Name System (DNS) request sent using a connectionless protocol to a DNS server, the product comprising a tangible computer-readable medium in which program instructions are stored, which instructions, when executed by at least one processor cause the at least one processor:
    to create a new DNS zone in the server, exclusively for authentication;
    to designate that the server is the only authoritative server for said new DNS zone in a global DNS network;
    to intercept a first Domain Name System (DNS) the DNS request that is addressed to the protected server, sent using a connectionless protocol over a network from a source address in order to provide network information regarding a domain name;
    to create a new canonical domain name belonging to said new DNS zone, exclusively for authentication;
    to send a DNS response to the source IP address by said only authoritative server for said new DNS zone, soliciting a client at the source IP address to send a DNS request containing a query for said new canonical domain name, using the connectionless protocol;
    to receive, using the connectionless protocol at said only authoritative server for said new DNS zone, a second DNS request containing a query for a requested domain name;
    to compare said requested domain name to said new canonical domain name; and
    to assess an authenticity of the source IP address based on a result of said comparing said requested domain name to said new canonical domain name.

21. The product according to claim 20, wherein the connectionless protocol comprises a User Datagram Protocol (UDP).

22. The product according to claim 20, wherein the instructions cause the at least one processor to encode a first cookie into said new canonical domain name, and to decode a second cookie in said second DNS request.

23. The product according to claim 22, wherein the instructions cause the at least one processor to encode into said first cookie at least one of:
    a first IP TTL (Time-to-Live) value extracted from the DNS request;
    an IP address corresponding to the source address;
    a character string representing said new canonical domain name; and
    a pseudo-random number.

24. The product according to claim 23, wherein the instructions cause the at least one processor to store at least a part of said first cookie in an authentication data structure, and wherein said assessing an authenticity comprises comparing said at least part of said first cookie with a corresponding part of said second cookie.

* * * * *

UNITED STATES PATENT AND TRADEMARK OFFICE
CERTIFICATE OF CORRECTION

PATENT NO. : 7,620,733 B1  Page 1 of 1
APPLICATION NO. : 11/094732
DATED : November 17, 2009
INVENTOR(S) : Tzakikario et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,620,733 B1  
APPLICATION NO. : 11/094732  
DATED : November 17, 2009  
INVENTOR(S) : Tzadikario et al.

It is certified that error appears in the above-identified patent and that said Letters Patent is hereby corrected as shown below:

Title Page  
Item (75) Inventors  
First inventor name should read  
Rephael Tzadikario, Palo Alto, CA (US)

Signed and Sealed this

Twenty-third Day of November, 2010

David J. Kappos  
*Director of the United States Patent and Trademark Office*